Figure 1:
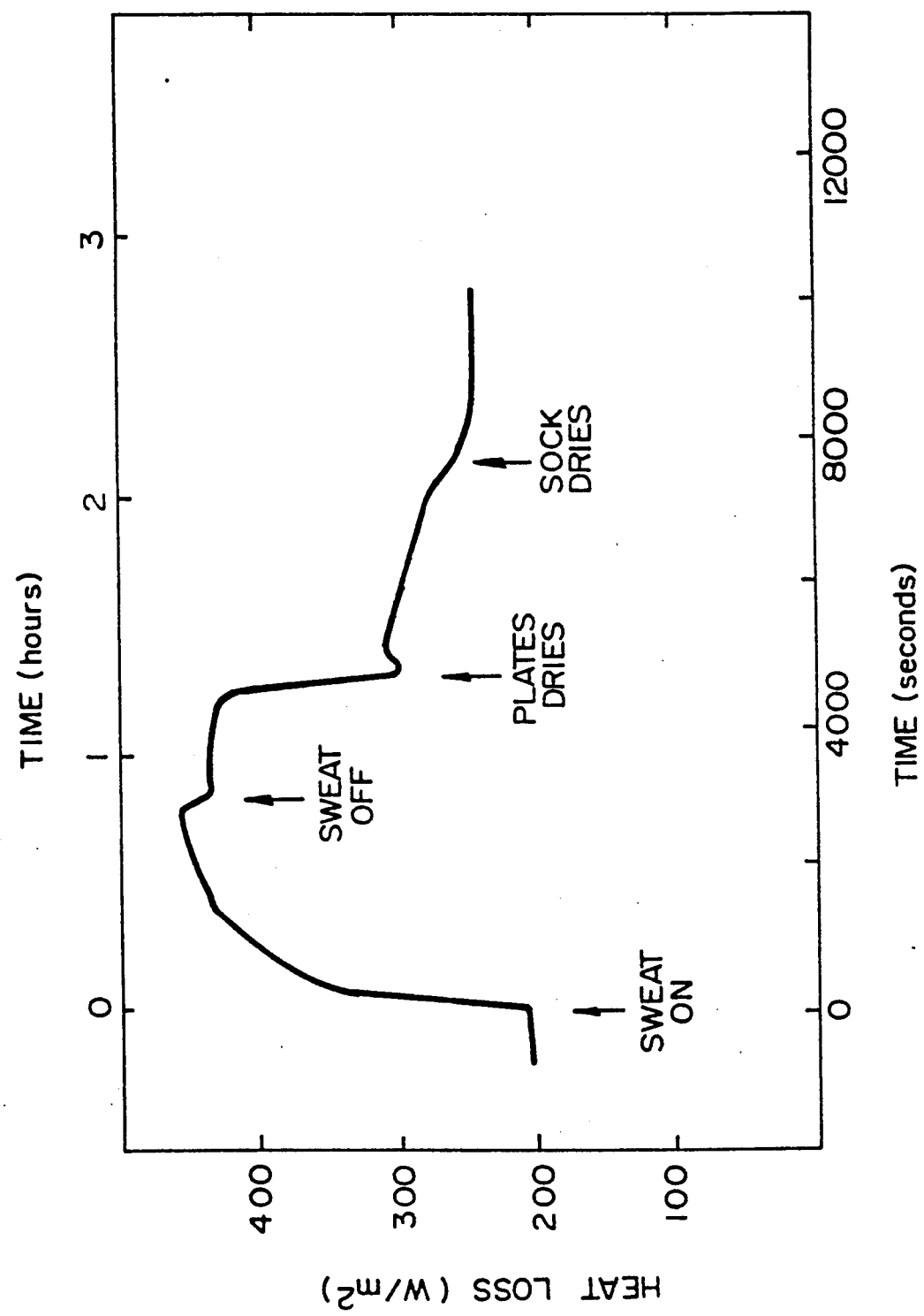

United States Patent [19]

Boissé et al.

[11] Patent Number: 5,043,209
[45] Date of Patent: Aug. 27, 1991

[54] ABSORBENT LINER FOR IMPERMEABLE CLOTHING

[75] Inventors: Sylvie Boissé, Ottawa; Brian Farnworth, Kinburn, both of Canada

[73] Assignee: Her Majesty the Queen in right of Canada, as represented by the Minister of National Defence, Ottawa, Canada

[21] Appl. No.: 397,289

[22] Filed: Aug. 23, 1989

[30] Foreign Application Priority Data

Nov. 22, 1988 [CA] Canada .................................. 583804

[51] Int. Cl.[5] ............................................. B32B 5/02
[52] U.S. Cl. ........................................ 428/233; 428/284; 428/288; 428/290; 428/296; 428/300; 428/373; 428/421; 428/422; 428/904; 428/913
[58] Field of Search ............... 428/284, 300, 283, 298, 428/421, 422, 904, 198, 253, 290, 288, 296, 233

[56] References Cited

U.S. PATENT DOCUMENTS

| | | | |
|---|---|---|---|
| 4,009,315 | 2/1977 | Healy et al. | 428/300 |
| 4,433,024 | 2/1984 | Eian | 428/198 |
| 4,465,730 | 8/1984 | Okada | 428/904 |
| 4,530,873 | 7/1985 | Okada | 428/253 |
| 4,539,982 | 9/1985 | Bailly | 428/300 |
| 4,632,860 | 12/1986 | D'Antonio et al. | 428/421 |
| 4,857,065 | 8/1989 | Seal | 428/283 |

Primary Examiner—James J. Bell
Attorney, Agent, or Firm—William R. Hinds

[57] ABSTRACT

Fluid impermeable, protective clothing is usually impermeable in both directions, and thus sweat is unable to evaporate from the skin or from inner clothing. A buildup of moisture is uncomfortable and, if prolonged, can cause pain and injury. A simple solution to the problem is to insert a two-layer liner in the impermeable clothing which will absorb the sweat. The liner includes an inner layer of vapor permeable, liquid impermeable material such as microporous Teflon (trademark) film, microporous polyurethane film or a hydrophilic polymer coating, and an outer layer of a material highly absorptive of both water vapor and liquid.

4 Claims, 2 Drawing Sheets

ABSORBENT LINER FOR IMPERMEABLE CLOTHING

This invention relates to a clothing liner, and in particular to a sweat absorbing liner for use in impermeable clothing.

Exposure to chemical, biological and nuclear hazards often occurs in military and industrial environments. Such hazards include gaseous, liquid and solid chemicals, viruses and radioactive substances. The wearing of fluid impermeable clothing as protection in such environments prevents evaporation of sweat from the skin or from inner clothing, resulting in an accumulation of moisture which may be uncomfortable or, if prolonged, injurious.

One solution to the problem is the use of an absorbent cotton lining. However, such a lining normally becomes damp after a short period of use. Thus, the skin still remains in a wet environment.

The object of the present invention is to provide a solution to the above-identified problem by providing a clothing liner which permits the passage of sweat vapour in one direction, while preventing the return of liquid in the other direction.

Accordingly, the present invention relates to a laminated clothing liner comprising an inner layer permeable to vapour and impermeable to liquid; and an outer layer highly absorptive to vapour and liquid, whereby the liner can absorb sweat while isolating the skin or inner clothing from absorbed moisture.

The principle behind the two layer liner is that liquid sweat on the skin or inner clothing can evaporate and pass through the inner layer as vapour, which is absorbed by the outer layer, preventing the accumulation of moisture on the skin or the inner clothing. Even if the absorptive layer becomes saturated with water, or is subjected to pressure, liquid is not transferred back to the skin because of the liquid impermeable nature of the first layer.

The rate of passage of vapour through the inner layer of the liner is determined primarily by the vapour concentrations on either side of such inner layer. Initially, the vapour concentration in the outer, absorptive layer is low, because of its large capacity for absorbing vapour. Moreover, the vapour concentration near wet skin is high and consequently the concentration gradient through the inner layer promotes diffusion. As the quantity of vapour absorbed by the outer layer increases, the vapour concentration of such outer layer increases, tending to the saturation vapour concentration. Nevertheless, the vapour concentration in the outer layer will normally be less than the vapour concentration in the vicinity of wet skin, since the temperature of the absorptive layer will usually be lower than that of the skin.

Materials which may be used to form the inner layer include a variety of films or coatings such as water repellent treated textiles or leather, microporous Teflon (trademark) films, e.g. the product available under the trademark "GORTEX"; microporous polyurethane films such as the product available under the trademark "DERMAFLEX"; or hydrophilic polymer coatings, e.g. the product available under the trademark "STEDTHANE". The inner layer next to the skin or inner clothing is vapour permeable to allow sweat to evaporate and collect on the outer side thereof as liquid.

Materials for the outer or absorptive layer include nonwovens composed of a blend of two synthetic fibers. One fiber is superabsorbent and the other fibre strengthens the fabric and acts as a wicking medium. Some examples of such materials include a needle-punched, nonwoven 70:30 blend of Lanseal (a trademark for a superabsorbent fibre manufactured by Japan Exlan Co. Ltd. and sold by Chori America Inc.) and polyester (type NP-6) ($0.15$ kg/m$^2$), or a thermal bonded, nonwoven 50:50 blend of Lanseal and a thermo-bonding bi-component of polypropylene (type A) ($0.05$ kg/m$^2$).

The liner should contain sufficient absorptive material to absorb all the sweat likely to be produced over the course of a typical period of wear for the garment. The liner can then be removed and dried for re-use or discarded and replaced. The NP-6 nonwoven can absorb 62 ml of water per gram of nonwoven and the A type will hold 30 ml/g. A very high sweat rate would be 1 kg/m$^2$/h. Thus, a layer of NP-6 nonwoven and A type of nonwoven permits heavy sweating for approximately 9 hours and 1.5 hours, respectively without preventing drying of the skin. The use of the absorptive liner permits the long term wearing of otherwise unacceptable garments such as, for example rubber boots in cold, wet weather, chemically protective butyl gloves and closed-cell foam insulated immersion suits.

In place of a highly vapour-absorbent material as the outer layer, a simpler traditional material such as a cotton knit may be used. In this case, water will accumulate in the absorbing layer as free liquid but only when the temperature of the impermeable layer is significantly below that of the skin. Experiments to simulate a glove liner at 25° C. ambient temperature showed that a vapour transfer rate from the skin to the absorptive cotton layer of about 200 g/m$^2$ h are possible. Experiments to simulate boot liners at 0° C. gave similar transfer rates. These are comparable to maximum sweat rates observed for hands and feet.

The accompanying drawings are schematic graphs of heat loss versus time for experiments of the type described above. The experiments were performed on the "sweating hot plate" described on pages 657 to 659 of an article entitled "A Numerical Model of the Combined Diffusion of Heat or Water Vapor Through Clothing", which was published in the Textile Research Journal, pages 653 to 665, Vol. 56, No. 11, November 1986. In the glove experiment, the plate was covered by a cotton knit T-shirt fabric (instead of the paper described in the article to spread the sweat. The sweat absorbing liner consisted of a layer of Goretex (trademark) teflon film and another layer of cotton knit.

The impermeable glove was simulated by a neoprene coated nylon fabric. Water was fed to the plate at a rate of 0.2 g/m$^2$/s for 2,000 s for a total input of 400 g/m$^2$. The ambient temperature was 25° C., and the temperature of the plate was 35° C. The heat loss from the plate was monitored before, during and after the sweating period and is shown in FIG. 1. A steady heat loss rate of 85 W/m$^2$ was observed before the sweat was switched on. Heat loss of 170 to 180 W/m$^2$ was observed during and after the sweating period until the plate and its cotton cover dried. The extra heat loss is due to evaporation from the plate. The heat loss then dropped to a new steady rate of 120 W/m$^2$, higher than the initial dry rate because of the loss of insulation of the now wet absorptive cotton knit layer. Inspection at the end of the experiment confirmed that the plate and its cotton cover were dry while the absorptive cotton layer was soaked.

Figure 2:
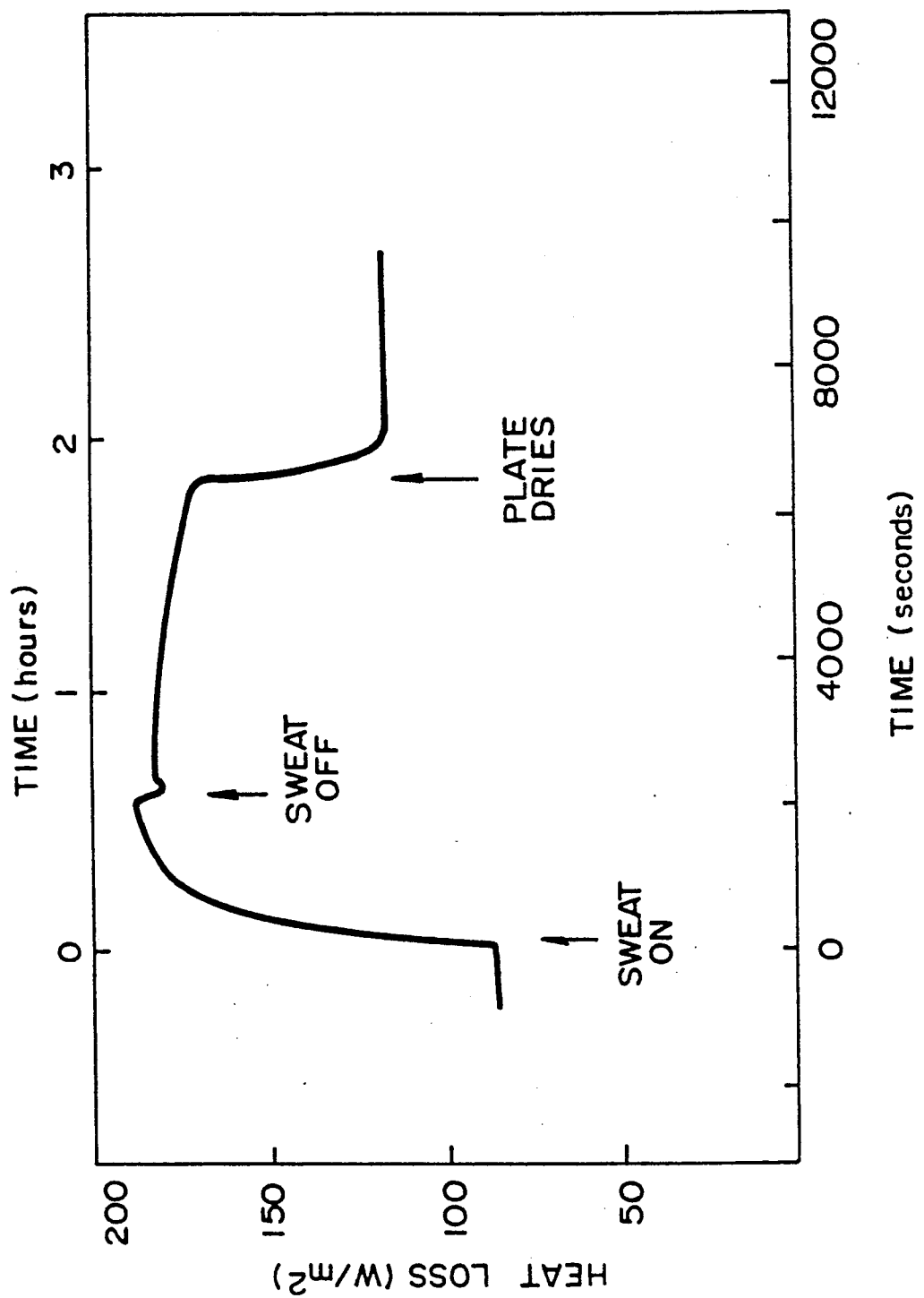

The results of a similar experiment to simulate a boot liner (to be used inside a rubber boot in cold-wet conditions) are shown in FIG. 2. The plate was covered by the same cotton knit, then a 3 mm thick polypropylene knitted sock, and the same Goretex, cotton and neoprene coated nylon layers as previously. The ambient temperature was 0° C. Sweat was fed in at a rate of 0.2 g/m$^2$/s for 3,000 s to give a 600 g/m$^2$ total input.

As with the glove, the drying of the plate can be identified by a drop in heat loss. A further drop can be identified with the drying of the polypropylene sock. Again, at the end of the experiment, inspection revealed a dry plate, dry sock, and a soaked cotton absorbing layer.

In the appendent claims, reference to a "superabsorbent fiber" is intended to mean the Lanseal identified herein before.

The embodiments of the invention in which an exclusive property or privilege is claimed are defined as follows:

1. A laminated clothing liner comprising an inner layer permeable to vapour and impermeable to liquid; and an outer layer highly absorptive to vapour and liquid, whereby the liner can absorb sweat while isolating the skin or inner clothing from absorbed moisture, said outer layer being selected from the group consisting of a needle-punched, nonwoven blend of a superabsorbent fiber and polyester, and a thermal bonded, nonwoven blend of a superabsorbent fiber and a thermo-bonding bicomponent of polypropylene.

2. A clothing liner according to claim 1, wherein said inner layer is formed of a material selected from the group consisting of water repellent textiles or leather, microporous polytetrafluoroethylene film, microporous polyurethane film and a hydrophilic polymer coating.

3. A clothing liner according to claim 1, wherein said outer layer is selected from the group consisting of a 70:30 needle-punched, nonwoven blend of a superabsorbent fiber and polyester; and a 50:50 thermal bonded, nonwoven blend of a superabsorbent fiber and a thermo-bonding bicomponent of polypropylene.

4. A clothing liner according to claim 2, wherein said outer layer is selected from the group consisting of a 70:30 needle-punched, nonwoven blend of a superabsorbent fiber and polyester; and a 50:50 thermal bonded, nonwoven blend of a superabsorbent fiber and a thermo-bonding bicomponent of polypropylene.

* * * * *